(12) United States Patent
Hirase et al.

(10) Patent No.: US 11,436,875 B2
(45) Date of Patent: Sep. 6, 2022

(54) PROTOCOL CONVERSION DEVICE AND VEHICLE DIAGNOSTIC SYSTEM

(71) Applicant: SUBARU CORPORATION, Tokyo (JP)

(72) Inventors: Hiromi Hirase, Tokyo (JP); Yoshinori Yamada, Tokyo (JP); Ryuichiro Imai, Tokyo (JP); Atsushi Takahashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 238 days.

(21) Appl. No.: 16/597,062

(22) Filed: Oct. 9, 2019

(65) Prior Publication Data

US 2020/0118364 A1 Apr. 16, 2020

(30) Foreign Application Priority Data

Oct. 12, 2018 (JP) .............................. JP2018-193212

(51) Int. Cl.
*G07C 5/08* (2006.01)
*G07C 5/00* (2006.01)
(Continued)

(52) U.S. Cl.
CPC ........... *G07C 5/0808* (2013.01); *G07C 5/008* (2013.01); *H04L 67/025* (2013.01); *H04L 69/18* (2013.01); *G07C 2205/02* (2013.01)

(58) Field of Classification Search
CPC .. G07C 5/0808; G07C 5/008; G07C 2205/02; H04L 69/18; H04L 69/08; H04L 67/025; H04L 67/12; H04L 67/02; G01M 17/007
See application file for complete search history.

(56) References Cited

U.S. PATENT DOCUMENTS

| | | | | |
|---|---|---|---|---|
| 6,636,790 B1* | 10/2003 | Lightner | ............. | G01M 15/102 |
| | | | | 701/31.5 |
| 2018/0212967 A1 | 7/2018 | Chen et al. | | |
| 2021/0014318 A1* | 1/2021 | Xiao | .................... | G07C 5/0808 |

FOREIGN PATENT DOCUMENTS

| | | | |
|---|---|---|---|
| EP | 2 990 774 A1 | 3/2016 | |
| JP | 2014-215052 A | 11/2014 | |
| KR | 100986982 B1 * | 10/2010 | |

OTHER PUBLICATIONS

Japanese Office Action dated May 17, 2022 for Japanese Patent Application No. 2018-193212 (3 pages in Japanese with English Translation),.

* cited by examiner

*Primary Examiner* — Austin J Moreau
(74) *Attorney, Agent, or Firm* — Smith, Gambrell & Russell, LLP

(57) ABSTRACT

A protocol conversion device includes a converter and a communicator. The converter makes a protocol conversion of vehicle data acquired from a vehicle by communication based on a first protocol, into vehicle data in a format of HTTP or HTTPS as a second protocol. The vehicle data is directed to diagnosis of the vehicle. The communicator transmits the vehicle data protocol-converted by the converter, to a communication terminal that is able to execute, by communication based on the second protocol, a vehicle diagnosis program held by a web server. The converter makes a protocol conversion of data transmitted from the communication terminal by the communication based on the second protocol, into data in a first protocol format. The communicator transmits, to the vehicle by the communication based on the first protocol, the data in the first protocol format that is protocol-converted by the converter.

20 Claims, 3 Drawing Sheets

(51) Int. Cl.
*H04L 69/18* (2022.01)
*H04L 67/025* (2022.01)

PROTOCOL CONVERSION DEVICE AND VEHICLE DIAGNOSTIC SYSTEM

CROSS-REFERENCE TO RELATED APPLICATIONS

The present application claims priority from Japanese Patent Application No. 2018-193212 filed on Oct. 12, 2018, the entire contents of which are hereby incorporated by reference.

BACKGROUND

The technology relates to a protocol conversion device and a vehicle diagnostic system.

There have been known techniques of diagnosing vehicles by allowing a server to execute, on the basis of vehicle data, a program directed to vehicle diagnosis. For example, Japanese Unexamined Patent Application Publication (JP-A) No. 2014-215052 describes a technique of diagnosing vehicles as follows. A communication terminal acquires vehicle data from a vehicle and transmits the vehicle data to a server. The server analyzes the vehicle data with the use of a diagnosis application.

SUMMARY

An aspect of the technology provides a protocol conversion device including a converter and a communicator. The converter is configured to make a protocol conversion of vehicle data acquired from a vehicle by communication based on a first protocol, into vehicle data in a format of HTTP or HTTPS as a second protocol. The vehicle data is directed to diagnosis of the vehicle. The communicator is configured to transmit the vehicle data protocol-converted by the converter, to a communication terminal that is able to execute, by communication based on the second protocol, a vehicle diagnosis program held by a web server. The converter is configured to make a protocol conversion of data transmitted from the communication terminal by the communication based on the second protocol, into data in a first protocol format. The communicator is configured to transmit, to the vehicle by the communication based on the first protocol, the data in the first protocol format that is protocol-converted by the converter.

An aspect of the technology provides a vehicle diagnostic system including a data acquirer, a converter, a communicator, and a web server. The data acquirer is configured to acquire, from a vehicle, by communication based on a first protocol, vehicle data directed to diagnosis of the vehicle. The converter is configured to make a protocol conversion of the vehicle data into vehicle data in a format of HTTP or HTTPS as a second protocol. The communicator is configured to transmit the vehicle data protocol-converted by the converter, to a communication terminal that is able to execute, by communication based on the second protocol. The vehicle diagnosis program is directed to the diagnosis of the vehicle. The web server holds the vehicle diagnosis program. The converter is configured to make a protocol conversion of data transmitted from the communication terminal by the communication based on the second protocol, into data in a first protocol format. The communicator is configured to transmit, to the vehicle by the communication based on the first protocol, the data in the first protocol format that is protocol-converted by the converter.

An aspect of the technology provides a protocol conversion device including circuitry. The circuitry is configured to make a protocol conversion of vehicle data acquired from a vehicle by communication based on a first protocol, into vehicle data in a format of HTTP or HTTPS as a second protocol. The vehicle data is directed to diagnosis of the vehicle. The circuitry is configured to transmit the protocol-converted vehicle data to a communication terminal that is able to execute, by communication based on the second protocol, a vehicle diagnosis program held by a web server. The circuitry is configured to make a protocol conversion of data transmitted from the communication terminal by the communication based on the second protocol, into data in a first protocol format. The circuitry is configured to transmit the data in the first protocol format to the vehicle by the communication based on the first protocol.

An aspect of the technology provides a vehicle diagnostic system including circuitry and a web server. The circuitry is configured to acquire, from a vehicle, by communication based on a first protocol, vehicle data directed to diagnosis of the vehicle. The circuitry is configured to make a protocol conversion of the vehicle data into vehicle data in a format of HTTP or HTTPS as a second protocol. The circuitry is configured to transmit the protocol-converted vehicle data to a communication terminal that is able to execute, by communication based on the second protocol, a vehicle diagnosis program directed to the diagnosis of the vehicle. The web server holds the vehicle diagnosis program. The circuitry is configured to make a protocol conversion of data transmitted from the communication terminal by the communication based on the second protocol, into data in a first protocol format. The circuitry is configured to transmit the data in the first protocol format to the vehicle by the communication based on the first protocol.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

<0. Background>

Figure 1:
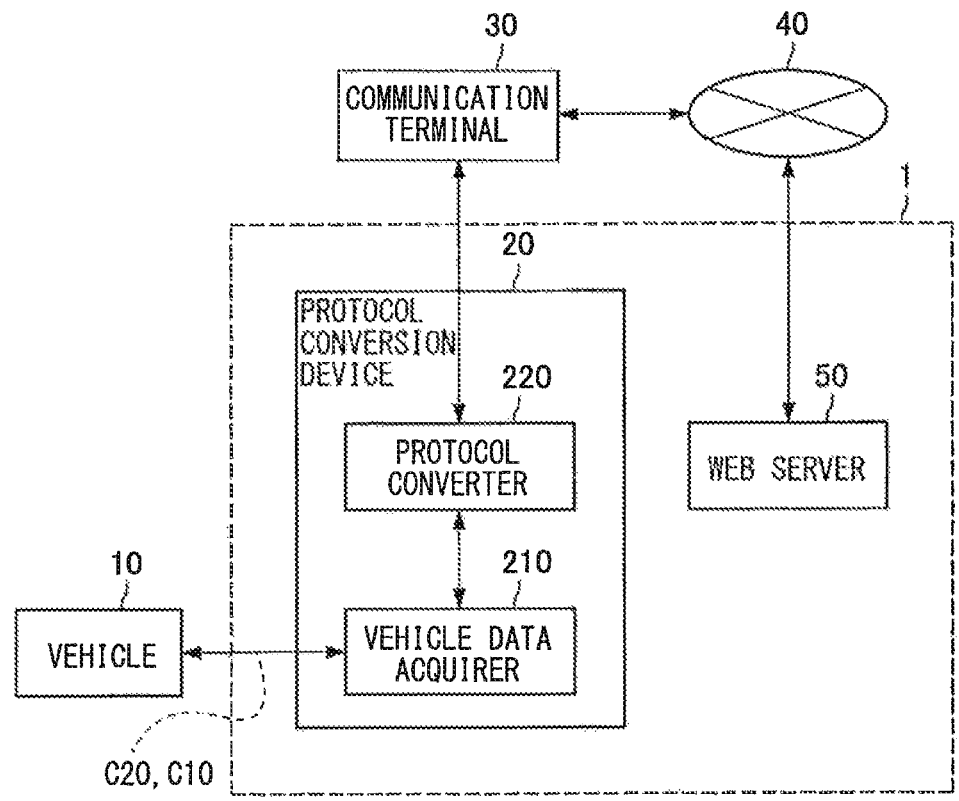
FIG. 1 is a block diagram illustrating an example of a configuration of a vehicle diagnostic system according to an embodiment of the technology.

In order for a communication terminal to allow a Web server to execute, for example, a vehicle diagnosis program, the communication terminal and the Web server carry out communication with the use of a protocol such as HTTP (Hypertext Transfer Protocol) or HTTPS (Hypertext Transfer Protocol Secure).

Meanwhile, vehicle data is transmitted from a vehicle to an interface (I/F). The communication terminal acquires the vehicle data by communicating with the I/F. In the existing techniques, the communication terminal communicates with the I/F by a protocol to be used in communication between the vehicle and the I/F.

In general, the protocol to be used in the communication between the vehicle and the I/F is different from the protocol to be used in the communication between the communication terminal and the Web server. Accordingly, the protocol to be used in the communication between the I/F and the communication terminal is different from the protocol to be used in the communication between the communication terminal and the Web server. This necessitates the communication terminal to make a protocol conversion of the vehicle data acquired from the I/F into vehicle data that allows for the communication with the Web server. It is therefore necessary for the communication terminal to have high performance enough to make the protocol conversion of the vehicle data.

The technique as described in JP-A No. 2014-215052, however, takes little consideration of difference between the protocol to be used in the communication between the I/F of the vehicle and the communication terminal, and the protocol to be used in the communication between the communication terminal and the Web server.

It is desirable to provide a new and improved protocol conversion device for vehicle diagnosis and a vehicle diagnostic system that make it possible to match a protocol to be used in communication between an I/F of a vehicle and a communication terminal, with a protocol to be used in communication between the communication terminal and a Web server.

In the following, some preferred but non-limiting embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same numerals to avoid redundant description, and elements not in direct relation to the technology may not be illustrated.

<1. Vehicle Diagnostic System>

In the following, described is a vehicle diagnostic system 1 according to an embodiment of the technology, with reference to FIGS. 1 to 3. FIG. 1 is a block diagram illustrating an example of a configuration of the vehicle diagnostic system 1 according to an embodiment of the technology. The vehicle diagnostic system 1 includes a protocol conversion device 20 and a Web server 50. In diagnosing a vehicle 10, the protocol conversion device 20 may be coupled to the vehicle 10. The protocol conversion device 20 may be also coupled, by wire or wirelessly, to a communication terminal 30. Furthermore, the communication terminal 30 and the Web server 50 may be coupled via a network 40.

(Protocol Conversion Device)

The protocol conversion device 20 may serve as an I/F coupled to the vehicle 10 to make it possible for the vehicle 10 and the communication terminal 30 to carry out transmission and reception. The protocol conversion device 20 acquires vehicle data from the vehicle 10, converts the vehicle data into vehicle data in a format of HTTP or HTTPS as a second protocol, and transmits the resultant vehicle data to the communication terminal 30. Moreover, the protocol conversion device 20 converts data acquired from the communication terminal 30 by communication based on the second protocol, into data in a first protocol format. The protocol conversion device 20 may include a vehicle data acquirer 210 and a protocol converter 220, which are provided for embodiment of what is described above as to the protocol conversion device 20.

The protocol conversion device 20 may further include a coupling terminal C20 in conformity with an OBD (On-Board Diagnostics) standard. Coupling the coupling terminal C20 of the protocol conversion device 20 and an OBD connector C10 of the vehicle 10 to each other makes it possible for the protocol conversion device 20 and the vehicle 10 to be able to communicate. It is to be noted that the protocol conversion device 20 and the vehicle 10 may be coupled wirelessly.

The vehicle data acquirer 210 acquires the vehicle data from a memory of the vehicle 10, by communication based on a first protocol. The vehicle data may include various pieces of information to be used in diagnosing the vehicle 10. Non-limiting examples of the vehicle data may include an engine rotation speed, temperatures of various parts, e.g., an engine, of the vehicle 10, and a trouble code. The first protocol may include a communication protocol standardized as to the OBD such as, but not limited to, ISO9151 or SAEJ1850. It is to be noted that the vehicle data acquirer 210 may acquire the vehicle data from the vehicle 10, in accordance with a request for the vehicle data. The request for the vehicle data may be made by the communication terminal 30. The vehicle data acquired by the vehicle data acquirer 210 may be transferred to the protocol converter 220.

The protocol converter 220 may receive the data from the communication terminal 30 by the communication based on the second protocol, and make the protocol conversion of the data into the data in the first protocol format. The relevant data may include, for example but not limited to, data indicating the request for the vehicle data of the vehicle 10. Furthermore, the protocol converter 220 may make the protocol conversion of the vehicle data into the vehicle data in a second protocol format, and transmit the protocol-converted vehicle data to the communication terminal 30. Description now moves on to more details of a configuration of the protocol converter 220 according to an embodiment of the technology, with reference to FIG. 2.

Figure 2:
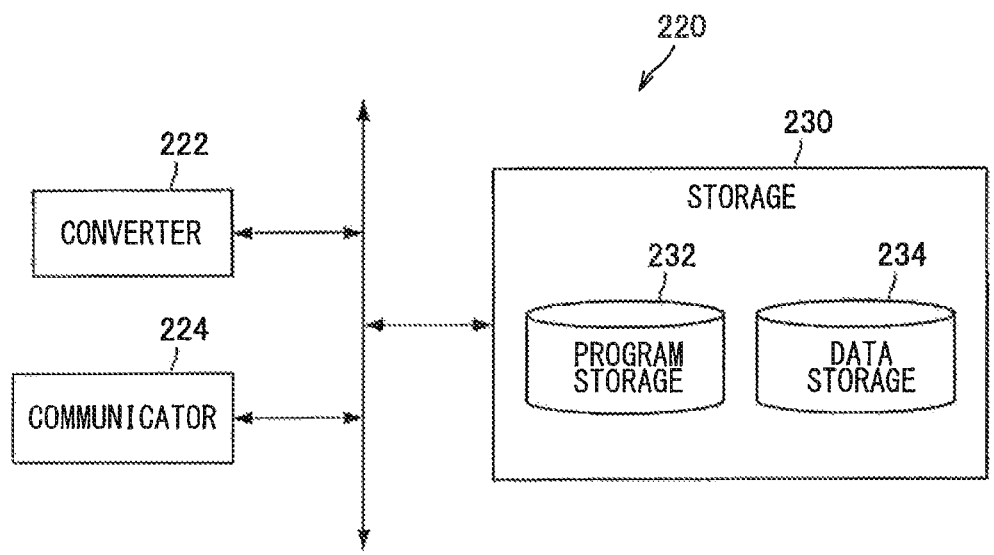
FIG. 2 is a block diagram illustrating an example of a configuration of a protocol converter according to an embodiment of the technology.
Figure 3:
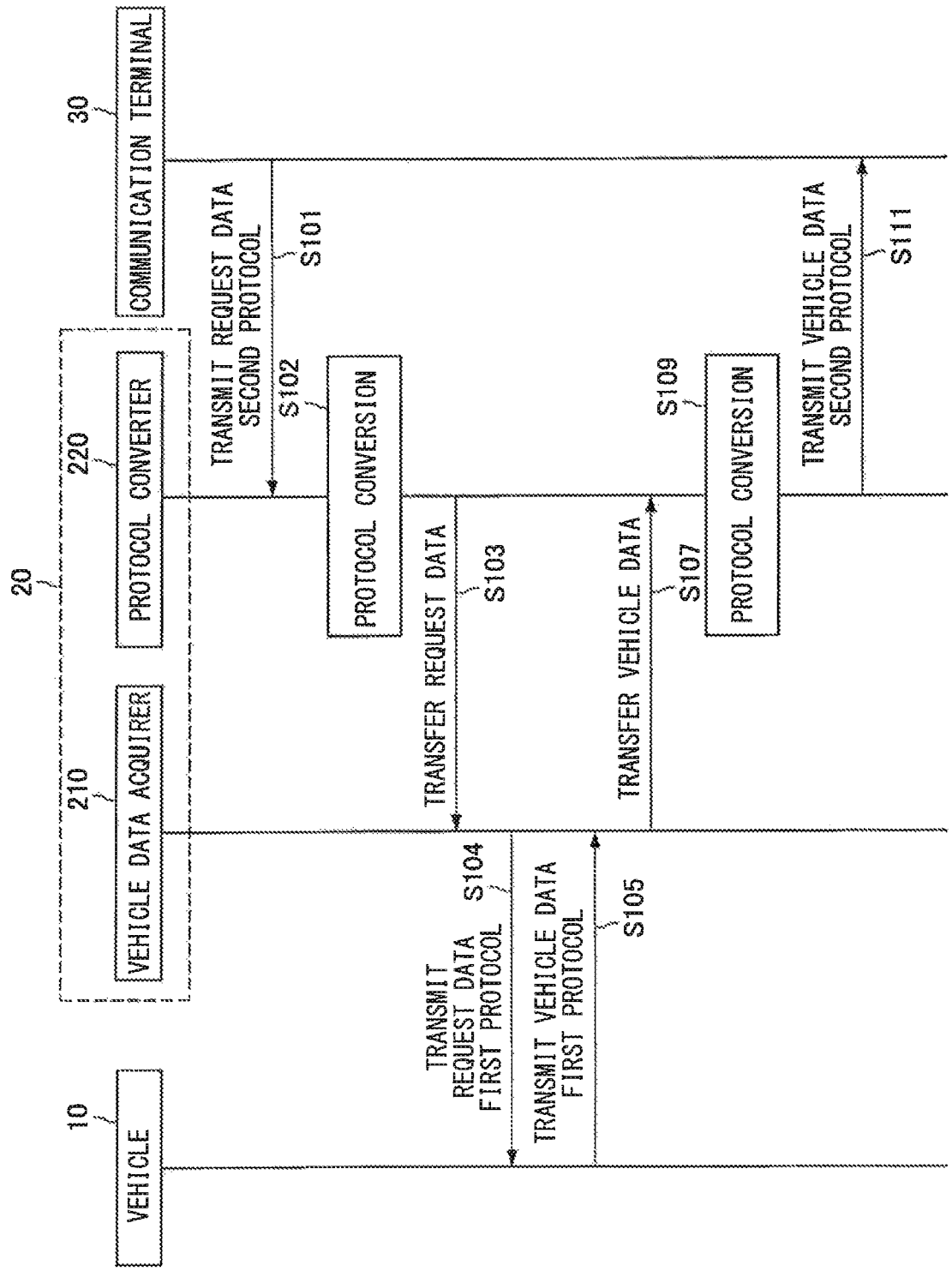
FIG. 3 is a diagram describing an example of operation of a protocol conversion device according to an embodiment of the technology.

FIG. 2 is a block diagram illustrating an example of a configuration of the protocol converter 220 according to an embodiment of the technology. The protocol converter 220 may include a converter 222, a communicator 224, and a storage 230.

The converter 222 may include a processor such as, but not limited to, a CPU (Central Processing Unit). The converter 222 may make the protocol conversion of the vehicle data transferred from the vehicle data acquirer 210, into the vehicle data in the second protocol format. Furthermore, the converter 222 may make the protocol conversion of the data in the second protocol format, into the data in the first protocol format. It is to be noted that the converter 222 may carry out the protocol conversion on the basis of a protocol conversion program directed to the protocol conversion and held by the storage 230. The protocol-converted vehicle data may be transmitted to the communication terminal 30 via the communicator 224.

The storage 230 may include a program storage 232 and a data storage 234. The data storage 234 may hold the vehicle data transferred from the vehicle data acquirer 210. The program storage 232 may hold the protocol conversion program directed to the protocol conversion of the vehicle data. The protocol conversion program may include a first program and a second program. The first program is directed to the protocol conversion of the vehicle data in the first protocol format, into the vehicle data in the second protocol format. The second program is directed to the protocol conversion of the data in the second protocol format into the data in the first protocol format. The first and second programs may constitute a single program, or alternatively, they may be different programs from each other, (Communication Terminal)

The communication terminal 30 may include, for example, a personal computer (PC) or a tablet-type terminal. The communication terminal 30 may be able to be coupled to the Web server 50 via the network 40, and be able to receive Web browser window data from the Web server 50. Here, a Web browser window is a window that is able to be opened to the public on the Internet using WWW (World Wide Web) systems. The Web browser window data may include text data, layout data based on HTML (Hyper Text Markup Language), and data such as, but not limited to, images, sounds, and/or moving images embedded in documents.

The communication terminal 30 may incorporate a Web browser. The Web browser works to allow the Web browser window received from the Web server 50, to be displayed on a display device of the communication terminal 30. In addition, the communication terminal 30 may receive, from the Web server 50, for example, a program directed to acquisition of the vehicle data from the vehicle 10. Using the program, the communication terminal 30 may acquire the vehicle data from the vehicle 10. Thus, the communication terminal 30 may acquire, as appropriate, the program from the Web server 50, and execute the program. This causes processing of diagnosing the vehicle 10 to be shared by the communication terminal 30 and the Web server 50, leading to suppression of an excessive processing load on the communication terminal 30 or the Web server 50.

The communication terminal 30 may be able to transmit, to the Web server 50, the vehicle data received from the protocol conversion device 20. In addition, an operator may be able to allow the Web server 50 to execute the vehicle diagnosis program, by operating an input device of the communication terminal 30 to transmit a request for execution of the vehicle diagnosis program to the Web server 50. Further, the communication terminal 30 may be able to transmit, to the Web server 50, data inputted to the communication terminal 30 by the operator operating the input device. The Web server 50 may diagnose the vehicle 10 on the basis of the data. The input device as referred to here may include various known input devices such as, but not limited to, a mouse, a keyboard, or a touchscreen.

Described next is an example of operation of the protocol conversion device 20 according to an embodiment of the technology, with reference to FIG. 3. In one more specific but non-limiting example, described is a procedure as to how the protocol conversion device 20 makes the protocol conversion of the vehicle data acquired from the vehicle 10, and thereafter, transmits the resultant vehicle data to the communication terminal 30. Description is given of an example case where the Web server 50 executes the vehicle diagnosis program in accordance with the request from the communication terminal 30.

First, the communication terminal 30 may transmit request data to the protocol converter 220 of the protocol conversion device 20, by the communication based on the second protocol (step S101). The request data indicates the request for the vehicle data to be involved in diagnosing the vehicle 10. Thereafter, the protocol converter 220 may make the protocol conversion of the request data received in step S101, into the data in the first protocol format (step S102). Furthermore, the protocol converter 220 may transfer the request data to the vehicle data acquirer 210 by the communication based on the first protocol (step S103).

Thereafter, the vehicle data acquirer 210 may transmit the request data to the vehicle 10 by the communication based on the first protocol (step S104). Thereafter, the vehicle 10 may transmit the vehicle data to the vehicle data acquirer 210, and the vehicle data acquirer 210 may receive the vehicle data (step S105). Thereafter, the vehicle data acquirer 210 may transfer the received vehicle data to the protocol converter 220 (step S107).

Thereafter, the protocol converter 220 may make the protocol conversion of the vehicle data transferred in step S107, into HTTP or HTTPS as the second protocol (step S109). The protocol converter 220 may transmit the protocol-converted vehicle data to the communication terminal 30 (step S111). The vehicle data transmitted to the communication terminal 30 may be transmitted to the Web server 50.

In the forgoing, described is an example of the operation of the protocol conversion device 20 according to an embodiment of the technology.

(Web Server)

The Web server 50 may hold the vehicle diagnosis program directed to the diagnosis of the vehicle 10. The Web server 50 may diagnose the vehicle 10 by executing the vehicle diagnosis program in accordance with the request from the communication terminal 30. In one more specific but non-limiting example, the Web server 50 may receive the vehicle data from the communication terminal 30, and diagnose the vehicle 10 with the use of the vehicle data. In addition, the Web server 50 may include a database that holds the vehicle data and/or data regarding, for example but not limited to, a diagnosis result of the vehicle 10 subjected to the diagnosis. Further, the Web server 50 may search the database. For example, the Web server 50 may retrieve the data regarding, for example but not limited to, the diagnosis result of the vehicle 10 from the database, on the basis of the vehicle data, e.g., a vehicle identification number.

The Web server 50 may transmit, as necessary, the Web browser window data to the communication terminal 30 via the network 40. The Web browser window data is provided for displaying the Web browser window on the display device of the communication terminal 30. The communication terminal 30 may receive the Web browser window data from the Web server 50, causing the Web browser window to be displayed on the display device of the communication terminal 30. This makes it possible for the operator to browse the Web browser window created by the Web server 50. In addition, the Web server 50 may transmit, as appropriate, to the communication terminal 30, for example, the program directed to the acquisition of the vehicle data from the vehicle 10. That is, the Web server 50 may transmit, as appropriate, a program related to the diagnosis of the vehicle 10, to the communication terminal 30. The program may be executed by the communication terminal 30.

<2. Processing Example>

Figure 4:
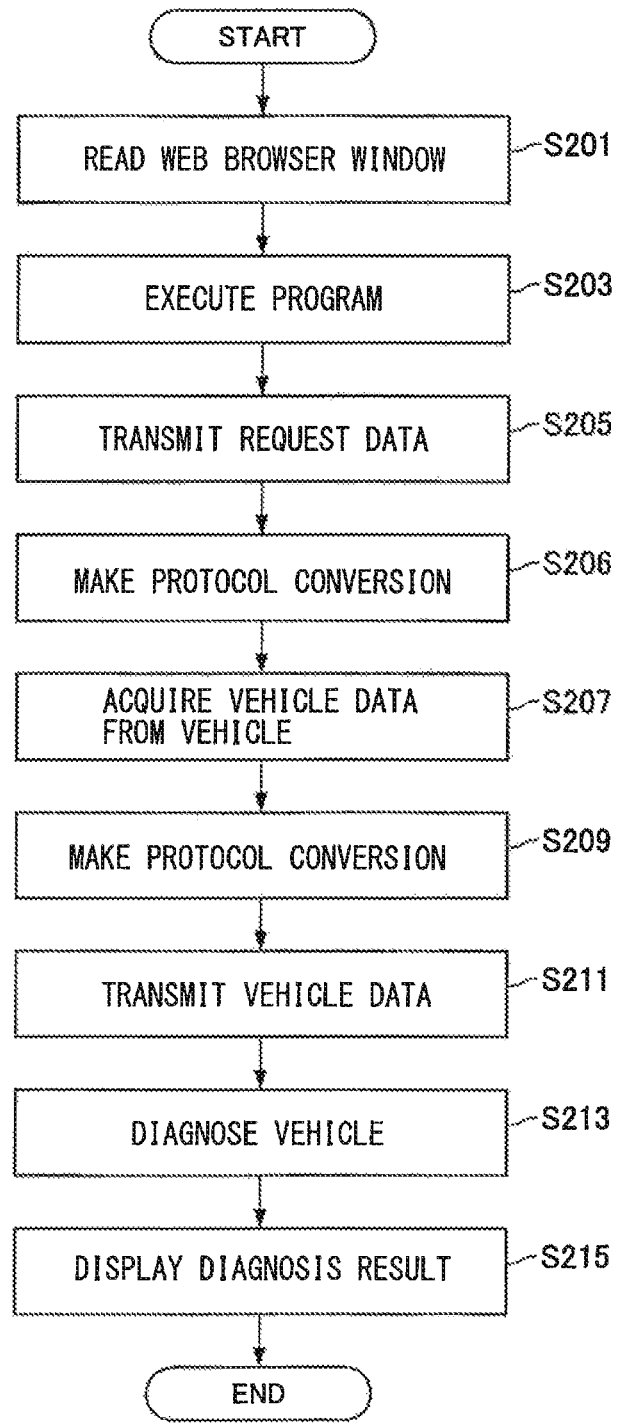
FIG. 4 is a diagram describing an example of operation of the vehicle diagnostic system according to an embodiment of the technology.

In the forgoing, described is an example of the configuration of the vehicle diagnostic system 1 according to an embodiment of the technology. Description now moves on to operation of the vehicle diagnostic system 1 according to an embodiment of the technology, with reference to a flowchart illustrated in FIG. 4. Description is given here of processing as to how the Web server 50 executes the vehicle diagnosis program in accordance with the operation of the input device of the communication terminal 30 by the operator, causing the diagnosis result of the vehicle 10 to be displayed on the display device of the communication terminal 30.

First, the communication terminal 30 may access the Web server 50 via the network 40, and read the Web browser window data provided for the execution of the vehicle diagnostic program (step S201). In one specific but non-limiting example, the operator may operate the input device of the communication terminal 30, to allow the communication terminal 30 to receive the Web browser window data from the Web server 50. This causes the Web browser window to be displayed on the display device of the communication terminal 30. For example, the display device may provide display of, for example but not limited to, a start button that causes a start of the vehicle diagnosis program.

Thereafter, the communication terminal 30 may search a database of the vehicle as a target of the diagnosis. The database may be held by the Web server 50. Thus, the communication terminal 30 may acquire the necessary vehicle data from the Web server 50. Furthermore, the communication terminal 30 may receive and execute the program held by in the web server 50 and directed to the acquisition of the vehicle data (step S203). For example, the operator may operate the start button displayed on the display device in step S201, causing the communication terminal 30 to transmit a request for the execution of the vehicle diagnostic program to the Web server 50 via the network 40. Thus, the vehicle diagnosis program may be executed.

Thereafter, the communication terminal 30 may transmit the request data to the protocol conversion device 20 by the communication based on the second protocol (step S205). At this occasion, the communication terminal 30 may receive the request data from the Web server 50 and transmit the request data to the protocol conversion device 20. Alternatively, the communication terminal 30 may transmit the request data directly to the protocol conversion device 20 without receiving the request data from the Web server 50.

Thereafter, the protocol converter 220 may make the protocol conversion of the request data received in step S205 into the request data in the first protocol format (step S206). The protocol-converted request data may be transferred to the vehicle data acquirer 210.

Thereafter, the vehicle data acquirer 210 may acquire the vehicle data from the vehicle 10 (step S207). In one more specific but non-limiting example, the vehicle data acquirer 210 may transmit the request data to the vehicle 10 by the communication based on the first protocol, and acquire the vehicle data from the vehicle 10. The acquired vehicle data may be transferred to the protocol converter 220.

Thereafter, the protocol converter 220 may make the protocol conversion of the vehicle data (step S209). In one more specific but non-limiting example, the protocol converter 220 may convert the vehicle data in the first protocol format acquired in step S207 into the vehicle data in the second protocol format.

Thereafter, the protocol converter 220 may transmit the vehicle data protocol-converted in step S209, to the communication terminal 30 by the communication based on the second protocol (step S211). Further, the vehicle data transmitted to the communication terminal 30 may be transmitted to the Web server 50 via the network 40 by the communication based on the second protocol.

Thereafter, the Web server 50 may diagnose the vehicle 10 by using the vehicle data thus transmitted (step S213). In accordance with the diagnosis result, the Web server 50 may transmit, to the communication terminal 30, the Web browser window data that represents the diagnosis result. Thereupon, the diagnosis result may be displayed on the display device of the communication terminal 30 (step S215). This makes it possible for the operator to confirm the diagnosis result of the vehicle 10.

In the forgoing, described is an example of the operation of the vehicle diagnostic system 1 according to an embodiment of the technology.

<3. Effects>

In this embodiment, the communication terminal 30 may transmit the request data to the protocol conversion device 20 by the communication based on the second protocol (step S205). The request data indicates the request for the vehicle data. The protocol conversion device 20 may make the protocol conversion of the request data into the request data of the first protocol format (step S206).

Moreover, the protocol conversion device 20 may acquire the vehicle data from the vehicle 10 by the communication based on the first protocol (step S207). The protocol conversion device 20 may make the protocol conversion of the vehicle data acquired from the vehicle 10 into the vehicle data in the second protocol format (step S209). The protocol conversion device 20 may transmit the protocol-converted vehicle data to the communication terminal 30 by the communication based on the second protocol (step S211). Further, the communication terminal 30 may transmit the vehicle data to the Web server 50 via the network 40 by the communication based on the second protocol.

In this way, the protocol conversion device 20 may make the protocol conversion of the data of the second protocol format into the data in the first protocol format, or make the protocol conversion of the vehicle data in the first protocol format into the vehicle data in the second protocol format. This makes it possible to match the protocol for the communication between the protocol conversion device 20 as the I/F of the vehicle 10 and the communication terminal 30, with the protocol for the communication between the communication terminal 30 and the Web server 50.

In this embodiment, the protocol conversion device 20 makes the protocol conversion on various kinds of data. This renders it unnecessary for the communication terminal 30 to include, for example, the protocol conversion program. Therefore, as long as the communication terminal 30 is able to serve as the Web browser, it is possible to diagnose the vehicle 10, by allowing the Web server 50 to execute the vehicle diagnosis program held by the Web server 50.

Moreover, the vehicle diagnostic system 1 according to this embodiment saves the user the labor of installing the protocol conversion program in the communication terminal 30. It is therefore possible for the user to diagnose the vehicle 10 more easily.

Further effects of the vehicle diagnostic system according to an embodiment of the technology are described. Examples of methods of the vehicle diagnosis may include not only executing the vehicle diagnosis program held in the Web server 50 but also installing the vehicle diagnosis program in a control device such as a PC and executing the vehicle diagnosis program. In this case, when the program installed in the PC is modified by a program provider, it may be necessary to install the modified program in the PC again.

In the vehicle diagnostic system 1 according to this embodiment, the vehicle diagnosis program directed to the diagnosis of the vehicle 10 is held in the Web server 50 and the vehicle diagnosis program is executed by the Web server 50. It is therefore unnecessary to install the vehicle diagnosis program in the PC. This saves the labor of installing the vehicle diagnosis program in the PC every time the vehicle diagnosis program is modified.

It is to be noted that the program directed to the acquisition of the vehicle data from the vehicle 10 is executed on the communication terminal 30. This leads to the suppression of the excessive processing load on either the communication terminal 30 or the Web server 50.

As described above, in the vehicle diagnostic system 1 according to this embodiment, it is unnecessary to install the protocol conversion program and the vehicle diagnosis program in the communication terminal 30. Accordingly, the communication terminal 30 does not have to have high performance enough to execute these programs. This contributes to reduction in the cost of the communication terminal 30, making it possible to diagnose the vehicle 10 at a lower cost.

<4. Supplement>

Although some embodiments of the technology are described in detail by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

In the vehicle diagnostic system 1 according to an embodiment of the technology, the diagnosis of the vehicle 10 is ended by displaying the diagnosis result (step S215), but the technology is not limited to such an example embodiment. For example, the operator may refer to the diagnosis result and transmit the data regarding the diagnosis result to the Web server 50 using the input device of the communication terminal 30. The Web server 50 may further diagnose the vehicle 10 on the basis of the data regarding the diagnosis result.

Further, each step in the processing of the protocol conversion device 20 of the specification does not have to be processed in time series in the order described as the flowchart. For example, the steps in the processing of the protocol conversion device 20 may be processed in a different order from the order described in the flowchart, or may be processed in parallel.

The protocol conversion device 20 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the protocol conversion device 20 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the protocol conversion device 20 illustrated in FIG. 1.

Although the technology has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

The invention claimed is:

1. A protocol conversion device, comprising:
 a converter configured to make a protocol conversion of vehicle data acquired from a vehicle by communication based on a first protocol, into vehicle data in a format of HTTP or HTTPS as a second protocol, the vehicle data being directed to diagnosis of the vehicle; and
 a communicator configured to transmit the vehicle data protocol-converted by the converter, to a communication terminal that is able to execute, by communication based on the second protocol, a vehicle diagnosis program held by a web server,
 the converter being configured to make a protocol conversion of data transmitted from the communication terminal by the communication based on the second protocol, into data in a first protocol format, and
 the communicator being configured to transmit, to the vehicle by the communication based on the first protocol, the data in the first protocol format that is protocol-converted by the converter,
 wherein the communication terminal is configured to receive from the web server programming related to the vehicle diagnosis program such that vehicle diagnosis processing is shared between the communication terminal and the web server, and wherein the communication terminal is further configured such the operator of the communication terminal can request the web server to execute the vehicle diagnosis program.

2. The protocol conversion device according to claim 1, wherein the first protocol comprises a communication protocol standardized as to OBD.

3. The protocol conversion device according to claim 1, further comprising a coupling terminal to be coupled to an OBD connector of the vehicle.

4. The protocol conversion device according to claim 2, further comprising a coupling terminal to be coupled to an OBD connector of the vehicle.

5. The protocol conversion device according to claim 1, wherein the communication terminal is further configured to support a web page sourced from the web server.

6. The protocol conversion device according to claim 1, wherein the communication terminal is further configured to be the first, relative to the protocol conversion device, to receive and store data sourced from the converter and the first to receive and store data sourced from the web server via the network.

7. The protocol conversion device according to claim 1, wherein the communication terminal is wired to the converter.

8. The protocol conversion device according to claim 3, wherein the communication terminal is wired to the converter.

9. A vehicle diagnostic system, comprising:
a data acquirer configured to acquire, from a vehicle, by communication based on a first protocol, vehicle data directed to diagnosis of the vehicle;
a converter configured to make a protocol conversion of the vehicle data into vehicle data in a format of HTTP or HTTPS as a second protocol;
a communicator configured to transmit the vehicle data protocol-converted by the converter, to a communication terminal that is able to execute, by communication based on the second protocol, a vehicle diagnosis program directed to the diagnosis of the vehicle; and
a web server that holds the vehicle diagnosis program,
the converter being configured to make a protocol conversion of data transmitted from the communication terminal by the communication based on the second protocol, into data in a first protocol format, and
the communicator being configured to transmit, to the vehicle by the communication based on the first protocol, the data in the first protocol format that is protocol-converted by the converter, wherein the communication terminal is configured to receive from the web server programming related to the vehicle diagnosis program such that vehicle diagnosis processing is shared between the communication terminal and the web server, and wherein the communication terminal is further configured such the operator of the communication terminal can request the web server to execute the vehicle diagnosis program.

10. The vehicle diagnostic system according to claim 9, wherein the communication terminal is further configured to support a web page sourced from the web server.

11. The vehicle diagnostic system according to claim 9, wherein the communication terminal is further configured to be the first, relative to the protocol conversion device, to receive and store data sourced from the converter and the first to receive and store data sourced from the web server via the network.

12. The vehicle diagnostic system according to claim 9, wherein the communication terminal is wired to the converter.

13. A protocol conversion device, comprising circuitry configured to
make a protocol conversion of vehicle data acquired from a vehicle by communication based on a first protocol, into vehicle data in a format of HTTP or HTTPS as a second protocol, the vehicle data being directed to diagnosis of the vehicle, and
transmit the protocol-converted vehicle data to a communication terminal that is able to execute, by communication based on the second protocol, a vehicle diagnosis program held by a web server,
the circuitry being configured to
make a protocol conversion of data transmitted from the communication terminal by the communication based on the second protocol, into data in a first protocol format, and
transmit the data in the first protocol format to the vehicle by the communication based on the first protocol, wherein the communication terminal is configured to receive from the web server programming related to the vehicle diagnosis program such that vehicle diagnosis processing is shared between the communication terminal and the web server, and wherein the communication terminal is further configured such the operator of the communication terminal can request the web server to execute the vehicle diagnosis program.

14. The protocol conversion device according to claim 13, wherein the communication terminal is further configured to support a web page sourced from the web server.

15. The protocol conversion device according to claim 13, wherein the communication terminal is further configured to be the first, relative to the protocol conversion device, to receive and store data sourced from said circuitry being configured to make a protocol conversion, and the first to receive and store data sourced from the web server via the network.

16. The protocol conversion device according to claim 13, wherein the communication terminal is wired to the circuitry being configured to make a protocol conversion.

17. A vehicle diagnostic system, comprising:
circuitry configured to
acquire, from a vehicle, by communication based on a first protocol, vehicle data directed to diagnosis of the vehicle,
make a protocol conversion of the vehicle data into vehicle data in a format of HTTP or HTTPS as a second protocol, and
transmit the protocol-converted vehicle data to a communication terminal that is able to execute, by communication based on the second protocol, a vehicle diagnosis program directed to the diagnosis of the vehicle; and
a web server that holds the vehicle diagnosis program,
the circuitry being configured to
make a protocol conversion of data transmitted from the communication terminal by the communication based on the second protocol, into data in a first protocol format, and
transmit the data in the first protocol format to the vehicle by the communication based on the first protocol, wherein the communication terminal is configured to receive from the web server programming related to the vehicle diagnosis program such that vehicle diagnosis processing is shared between the communication terminal and the web server, and wherein the communication terminal is further configured such the operator of the communication terminal can request the web server to execute the vehicle diagnosis program.

18. The vehicle diagnostic system according to claim 17, wherein the communication terminal is further configured to support a web page sourced from the web server.

19. The vehicle diagnostic system according to claim 17, wherein the communication terminal is further configured to be the first, relative to the protocol conversion device, to receive and store data sourced from said circuitry being configured to make a protocol conversion, and the first to receive and store data sourced from the web server via the network.

20. The vehicle diagnostic system according to claim 17, wherein the communication terminal is wired to the circuitry being configured to make a protocol conversion.

\* \* \* \* \*